United States Patent
Hellmer et al.

(10) Patent No.: US 11,681,376 B1
(45) Date of Patent: Jun. 20, 2023

(54) SYSTEM AND METHOD FOR PROVIDING FEEDBACK TO A GUEST INTERACTING WITH A DISPLAY

(71) Applicant: Universal City Studios LLC, Universal City, CA (US)

(72) Inventors: Joli Madonna Hellmer, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/890,776

(22) Filed: Aug. 18, 2022

(51) Int. Cl.
*G06F 3/01* (2006.01)
*G06F 3/147* (2006.01)

(52) U.S. Cl.
CPC ............ *G06F 3/017* (2013.01); *G06F 3/147* (2013.01)

(58) Field of Classification Search
CPC .......... G06F 3/017; G06F 3/147; G06F 3/011; G06F 3/013; G06F 1/1601; G06T 15/04; G06V 40/28; H04N 5/272
See application file for complete search history.

(56) References Cited

U.S. PATENT DOCUMENTS

| | | | |
|---|---|---|---|
| 2005/0162381 A1* | 7/2005 | Bell | G06F 3/011 345/156 |
| 2008/0150913 A1* | 6/2008 | Bell | G06F 3/011 345/175 |
| 2012/0320443 A1* | 12/2012 | Fujiwara | G06F 1/1601 359/238 |
| 2014/0028711 A1* | 1/2014 | Kincaid | G06F 3/013 345/633 |
| 2017/0287060 A1* | 10/2017 | Choi | G06T 15/04 |
| 2021/0065286 A1* | 3/2021 | Woo | G06V 40/28 |
| 2022/0246113 A1* | 8/2022 | Koch | H04N 5/272 |

\* cited by examiner

*Primary Examiner* — Richard J Hong
(74) *Attorney, Agent, or Firm* — Fletcher Yoder, P.C.

(57) ABSTRACT

An interactive display includes a transparent display panel configured to simulate a windowpane. The interactive display also includes a motion-tracking device located behind the transparent display panel and configured to perform tracking of movement of a device directed at a front of the transparent display panel, wherein the device is configured to be manipulated by a user. The transparent display panel is configured to display feedback indicative of the tracked movement of the device.

20 Claims, 6 Drawing Sheets

SYSTEM AND METHOD FOR PROVIDING FEEDBACK TO A GUEST INTERACTING WITH A DISPLAY

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain, among many other attractions, interactive areas where guests make gestures (e.g., with or without a device) that elicit various special effects in response to these gestures. It is now recognized that sometimes the guests experience difficulties in properly executing the gestures to elicit the special effects. For example, the guest may make the wrong gesture. As a result, the guest may become frustrated with the interactive area. Accordingly, it may be desirable to provide assistance to the guests in executing these gestures to enhance their experience.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an interactive display includes a transparent display panel configured to simulate a windowpane. The interactive display also includes a motion-tracking device located behind the transparent display panel and configured to perform tracking of movement of a device directed at a front of the transparent display panel, wherein the device is configured to be manipulated by a user. The transparent display panel is configured to display feedback indicative of the tracked movement of the device.

In an embodiment, a method for providing feedback to a guest interacting with an interactive display includes detecting, via a motion-tracking device, movement of a device directed at a front of a transparent display panel of the interactive display by a user manipulating the device, wherein the transparent display panel is configured to simulate a windowpane. The method also includes displaying, on the transparent display panel, feedback indicative of the tracked movement of the device.

In an embodiment, a system for providing feedback to a guest interacting with an interactive display includes a transparent organic light-emitting diode (OLED) screen configured to simulate a windowpane. The system also includes a motion-tracking device located behind the transparent OLED screen and configured to perform tracking of movement of a device directed at a front of the transparent OLED, wherein the device is configured to be manipulated by a user. The transparent display panel is configured to display feedback indicative of the tracked movement of the device as the user is manipulating the device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure relates generally to guest interactive displays. More specifically, embodiments of the present disclosure relate to a system and a method for providing feedback to a guest interacting with a display.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments of the disclosure are directed to systems and methods for providing feedback to a guest interacting with an interactive display. For example, the disclosed systems and methods include a transparent display panel or screen configured to simulate a windowpane. The windowpane may be a part of window frame on a display case. The transparent display panel may be an organic light-emitting diode (OLED) screen or a projection screen (e.g., rear projection screen) associated with a projection system. The disclosed systems and methods include a motion-tracking device located behind the transparent display panel. The motion-tracking device is configured to perform tracking or tracing of movement of a device (e.g., sword, key, cane, stick, or any other device that can be pointed toward the transparent display panel) directed at a front of the transparent display panel by a user (e.g., guest) manipulating the device. In certain embodiments, the device may emit light (e.g., infrared (IR) light) that is tracked by the motion-tracking device (e.g., IR-tracking device). In certain embodiments, IR retroflection may be utilized where the motion-tracking device emits IR, the device reflects the IR, and the motion-tracking device tracks the reflected IR. In certain embodiments, near field communication (NFC) may be utilized between the tracking device and the device manipulated by the user. In certain embodiments, radiofrequency identification (RFID) may be utilized between the tracking device and the device utilized between the tracking device and the device manipulated by the user. The transparent display panel is configured to display feedback indicative of the tracked or traced movement of the device. In certain embodiments, the feedback may be displayed on the transparent display panel in real time (i.e., as the user is manipulating the device). The feedback provided regarding the movement of the device helps provide guidance to the user (e.g., guest) in manipulating the device to generate a special effect of the interactive display. Thus, the disclosed systems and methods may avoid any frustration by the guest with the interactive display. In addition, the disclosed systems and methods makes the interactive display more engaging for the guest.

Figure 1:
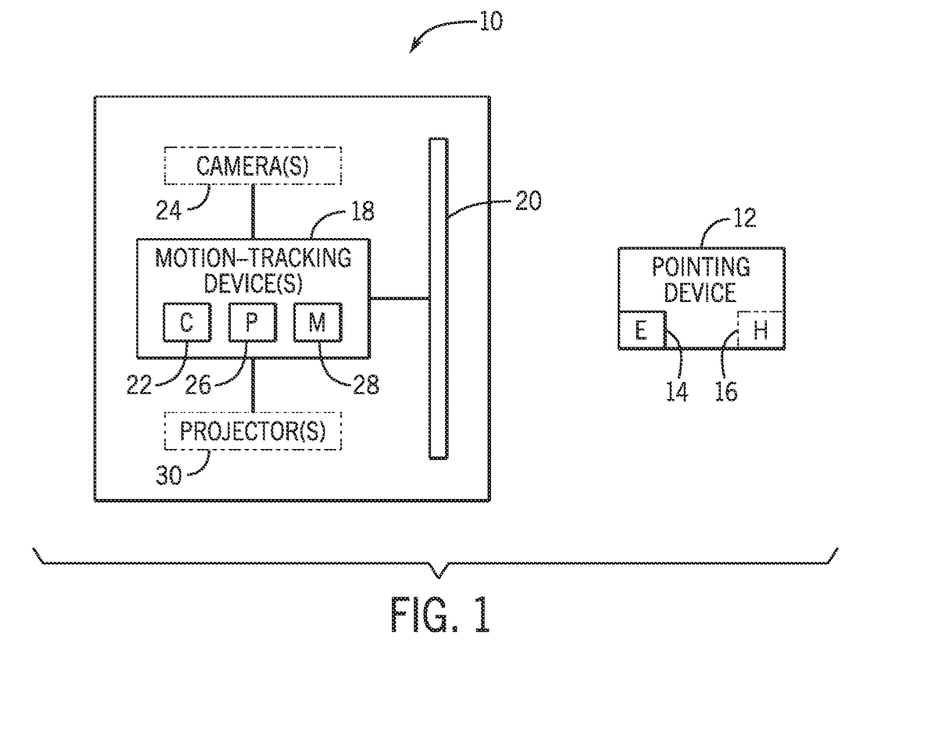
FIG. 1 is a schematic view of a system for providing feedback to a guest interacting with an interactive display and a device for use with the interactive display, in accordance with aspects of the present disclosure.

FIG. 1 is a schematic view of a system 10 for providing feedback to a guest interacting with an interactive display and a device 12 (e.g., pointing device) for use with the interactive display. The system 10 may be incorporated in an interactive display. The interactive display may be part of a display case. The interactive display may be located at an amusement park or entertainment venue. The interactive display may be associated with a particular theme. In certain embodiments, the interactive display may be a kiosk or might be located in a retail store not located at an amusement park or entertainment venue. Examples of a location may be a mall or an airport.

A user (e.g., guest) interacts with the interactive display and, thus, the system 10 by utilizing the device 12 (e.g., toy sword, key, cane, stick, or other type of pointing device). In particular, the user manipulates the device 12 (while directing it at the interactive display), according to a particular pattern or movement, to generate a special effect in the interactive display in response to correctly performing the movement. In certain embodiments, the device 12 includes an emitter 14 (e.g., located at an end of the device that can be pointed at the interactive display) for emitting light (e.g., IR). In certain embodiments, the device 12 may reflect light (e.g., IR) emitted by the motion-tracking device 18 via a retroflector. In certain embodiments, the device 12 may include a plurality of haptic actuators 16 (e.g., vibration actuators) to provide haptic feedback (e.g., in response to control signals from the system 10) as to how the user should manipulate the device 12 to correctly perform the movement to generate the special effect in the interactive display.

The system 10 includes a motion-tracking device 18 and a transparent display panel 20. The motion-tracking device 18 is configured to perform tracking of movement of the device 12 directed at a front of the transparent display panel 20 by the user manipulating the device 12. In certain embodiments, the motion-tracking light may track light (e.g., IR) emitted by the device 12. In certain embodiments, the motion-tracking device 18 may emit light (e.g., IR), which is reflected by the device 12, and then track the reflected light. In certain embodiments, the device 12 and the motion-tracking device 18 may utilize NFC. In certain embodiments, the device 12 and the motion-tracking device 18 may utilized RFID. In certain embodiments, other techniques may be utilized by the device and the motion-tracking device 18 to track movement of the device 12. The transparent display panel 20 is configured to display feedback indicative of the tracked movement of the device 12. In certain embodiments, the feedback indicative of the tracked movement of the device 12 is provided in real time (i.e., as the device 12 is being manipulated). In certain embodiments, the transparent display panel 20 may provide a visual indicator of where to direct the device 12 at the transparent display panel 20. In certain embodiments, the motion-tracking device 18 may include a camera 22 for tracking the light (e.g., IR) emitted or reflected by the device 12. In certain embodiments, the camera 22 may be utilized to detect an angle from which the light (e.g., IR) is being emitted or reflected from the device 12. In certain embodiments, one or more additional cameras 24 may be utilized to detect the angle from which light (e.g., IR) is being emitted or reflected from device 12. The angle from which the light (e.g., IR) is being emitted or reflected (e.g., as detected by the camera 22 and/or the cameras 24) may be utilized to determine a location (e.g., a height) along the transparent display panel 20 for providing feedback.

In certain embodiments, the motion-tracking device 18 includes one or more processors 26 and a memory 28. In certain embodiments, the one or more processors 26 and the memory 28 may be part of a processing or computing device separate from the motion-tracking device 18. The one or more processors 26 execute instructions contained in the memory 28. The memory 28 may store one or more patterns (e.g., correct patterns) associated with triggering one or more special effects of the interactive display via the detected movement of the device 12. The memory 28 may store instructions for tracking the movement of the device 12 and for providing feedback to the user on the transparent display panel 20. In certain embodiments, the memory 28 may store instructions for providing haptic feedback to the device 12. In certain embodiments, the memory 28 may store instructions for detecting an angle of where light (e.g., IR) is being emitted or reflected from the device 12 and determining a location (e.g., a height) on the transparent display panel 20 where the feedback should be provided to the guest. The memory 28 may store instructions for providing one or more images (e.g., simulating of frost or precipitation, a moving animation, etc.) on the transparent display panel 20 relevant to a theme of the interactive display. The instructions may be loaded in a random access memory (RAM) for execution by the processors 26 from a read only memory (ROM), a mass storage device, or some other persistent storage. In other embodiments, hard wired circuitry may be used in place of or in combination with software instructions to implement the functions described. For example, the processors 26 may be embodied as part of one or more application-specific integrated circuits (ASICs). The one or more processors 26 may generate control signals to components of the system 10 and/or the device 12. For example, control signals (e.g., for the haptic feedback) from the processors 26 may be provided to the device 12 wirelessly. Control signals from the processors 26 to the transparent display panel 20 may be provided via a wired or wireless connection.

The transparent display panel 20 is configured to simulate a windowpane (e.g., of a window frame). In certain embodiments, a plurality of the transparent display panels 20 may form the windowpanes of a window frame. In certain embodiments, the transparent display panel 20 may be an OLED screen. In this case, the motion-tracking device 18 may be coupled to the transparent display panel 20 via a wired or wireless connection. In certain embodiments, the transparent display panel 20 may be a projection screen (e.g., rear projection screen). When the transparent display panel 20 is a projection screen, the system 10 includes one or more projectors 30 for projection (e.g., of the feedback related to the tracked movement and any other item or image) on the projection screen. The motion-tracking device 18 may be coupled to the projectors 30 via a wired or wireless connection.

In certain embodiments of an interactive display with a plurality of transparent display panels 20, more than one transparent display panel 20 may be configured to display the feedback indicative of the tracked movement of the device 12. In certain embodiments, the system 10 may include a plurality of motion-tracking devices 18, with each motion-tracking device 18 configured to track movement of a respective device 12 being directed at a respective transparent display panel 20 and to cause display of feedback indicative of the tracked movement on the respective transparent display panel 20. Thus, in certain embodiments, different devices 12 may be utilized (e.g., simultaneously) by guests on different transparent display panels 20 of the interactive display, which the system 10 may separately track and provide feedback for to the respective guests. In certain embodiments, one or more display panels 20 or a portion of one or more display panels 20 may be layered to create a three-dimensional (3D) effect.

In certain embodiments, the feedback displayed on the transparent display panel 20 is the actual pattern or path of the tracked movement of the device 12. In certain embodiments, the actual (i.e., detected) pattern is displayed (e.g., in line with the location of where the device 12 is being manipulated) as it is being generated by the device 12 (i.e., in real time) or after the pattern has been completed. In certain embodiments, the actual pattern may be displayed as a continuous path (i.e., showing each point along the path of the tracked movement). In certain embodiments, displaying the actual pattern includes only displaying some of the points (e.g., discrete points) along the path of the tracked movement. In certain embodiments, the actual pattern is displayed according to a color coding. For example, if the actual pattern is incorrect (which will not elicit a special effect from the interactive display) it may be shown in a first color (e.g., red) and if the actual pattern is correct (which will elicit a special effect from the interactive display) it may be shown in a different second color (e.g., green). In certain embodiments, if the tracked movement is correct, a generic pattern representative of the correct movement of the device 12 may be shown on the transparent display panel 20. In certain embodiments, if the tracked movement is incorrect, the generic pattern representative of the correct movement of the device 12 may be shown to provide assistance. In certain embodiments, this generic pattern may be shown after each incorrect attempt or after a set number of incorrect attempts (e.g., 2 or 3 incorrect attempts). In certain embodiments, this generic pattern may be shown after a set period of time (e.g., 30 seconds or some other set period of time) has passed upon beginning trying to manipulate the device 12 correctly. In certain embodiments, the actual pattern and a generic pattern of the correct movement may both be shown separately and/or simultaneously on the transparent display panel 20 to assist the guest as they are attempting the pattern. In certain embodiments, the generic pattern of the correct movement may be etched in the transparent display panel 20 to provide guidance to the guest manipulating the device 12.

As mentioned above, the feedback and/or visual indicators of a location where to direct the device 12 may be provided via the diodes of the OLED screen or projection on a projection screen via the projectors 30. In certain embodiments, light emitting devices (LED) may be embedded in the transparent display panel 20 which may provide feedback indicative of the tracked movement. The embedded LEDs may be in communication with the motion-tracking device 18. In certain embodiments, the embedded LEDs are arranged according to the generic pattern representative of the correct movement of the device. In certain embodiments, the entire pattern is lit up only upon correctly completing the movement of the device 12. In certain embodiments, each point along the generic pattern may be lit up as it is correctly completed. In certain embodiments, entire sections of the generic pattern may be shown as correctly completed. In certain embodiments, one or more discrete embedded LEDs may indicate one or more respective locations for directing the device 12 at the transparent display panel 20.

Figure 2:
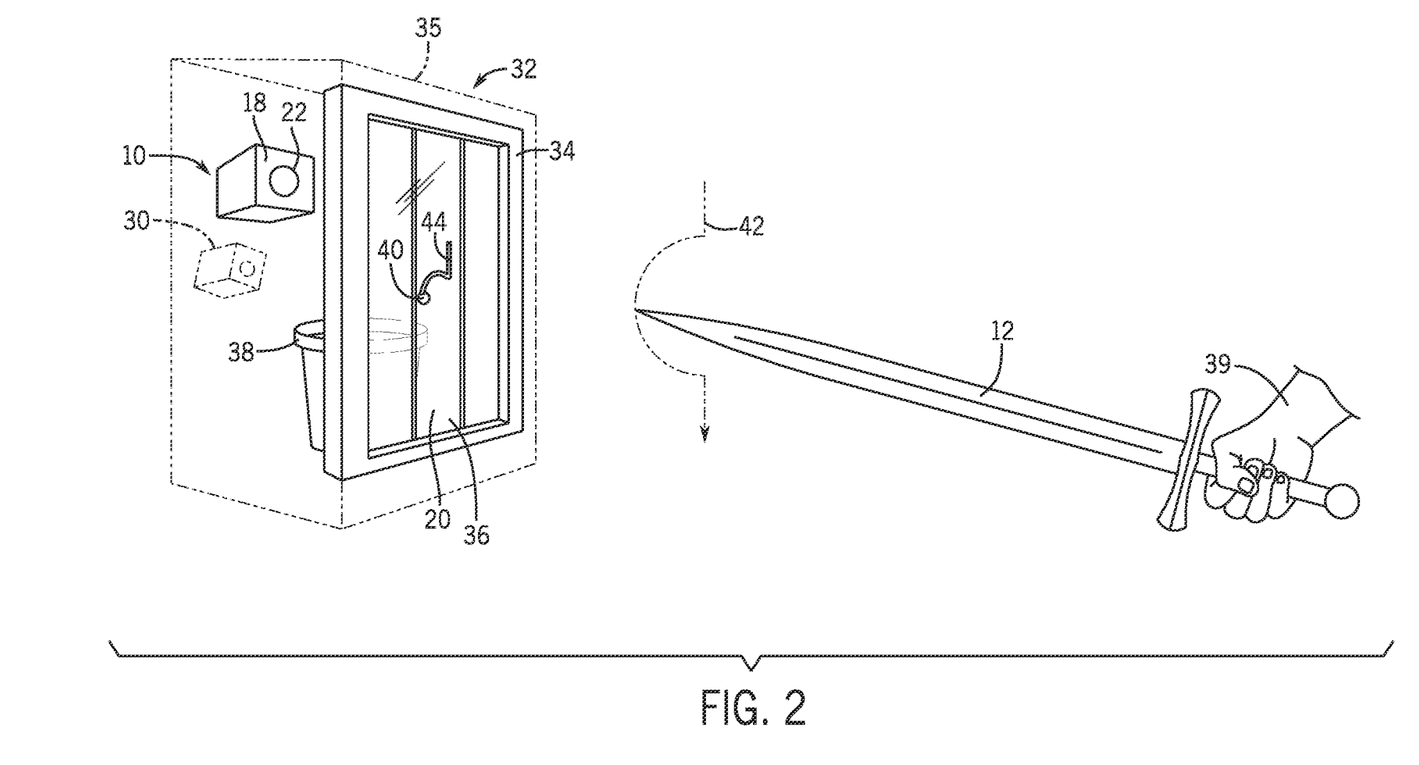
FIG. 2 is a schematic view of an interactive display having the system in FIG. 1, in accordance with aspects of the present disclosure.

FIG. 2 is a schematic view of an interactive display 32 having the system 10 in FIG. 1. As depicted, the interactive display 32 includes a display frame 34 (e.g., window frame). In certain embodiments, the interactive display 32 may be part of a display case 35. The display frame 34 includes a plurality of transparent panes 36 (e.g., windowpanes). At least one of the transparent panes 36 is the transparent display panel 20 as described above in FIG. 1. In certain embodiments, more than one transparent pane is a respective transparent display panel 20. In certain embodiments, each transparent pane 36 is a respective transparent display panel 20. In certain embodiments, the entire pane 36 (as depicted in FIG. 2) is the transparent display panel 20. In certain embodiments, the transparent display panel 20 only forms a portion of the pane 36. In certain embodiments, the transparent display panel 20 is an OLED screen. In certain embodiments, the transparent display panel 20 is a projection screen (e.g., rear projection screen) associated with one or more projectors 30 (as described in FIG. 1) located behind the display frame 34.

An object 38 is located behind the display frame 34. The number of objects 38 within the display 32 may vary. In certain embodiments, the object 38 may be for decoration in accordance with a theme for the interactive display 32. In certain embodiments, the object 38 may be the source of where a special effect occurs in response to the correct motion by the device 12. As depicted, the object 38 is a pot. The object 38 may be any type of object. The special effect may be a motion induced in the object 38 (e.g., rotation, shaking, etc.). In certain embodiments, the special effect may be something appearing out of the object 38. In certain embodiments, the special effect may be the object 38 changing appearance (e.g., stretching, cracking, etc.). In certain embodiments, the special effect within the interactive display 32 may be separate from or unrelated to the object. For example, the special effect may be the changing of lighting or conditions in the interactive display, the appearance of something (e.g., smoke or object) within the interactive display 32. The special effect may be something appearing on the transparent display panel 20. For example, features related to the theme of the interactive display 32 may appear on the transparent display panel 20. These features may be animations or objects (e.g., vines, cracks, precipitation, frost, etc.) on the transparent display panel 20. In certain embodiments, various objects or animations may appear on the transparent display panel 20 (e.g., related to a theme) separately from or independent of an induced special effect from the movement of the device 12.

The interactive display 32 includes the motion-tracking device 18 having the camera 22 as described in FIG. 1. The motion-tracking device 18 is disposed behind the display frame 34. The motion-tracking device 18 is configured to perform tracking of movement of the device 12 directed at a front of the transparent display panel 20 by a user 39 (e.g., guest) manipulating the device 12. As depicted, the device 12 is a toy sword. The appearance of the device 12 may be configured to be related to a theme of the interactive display 32 or an amusement park or entertainment venue where the interactive display 32 is located. The device 12 is utilized as a pointing device to direct the device towards the transparent display panel 20. As noted above, in certain embodiments, the interactive display 32 may include more than one motion-tracking device 18. The interactive display 32 having more than one motion-tracking device 18 enables multiple devices 12 to be tracked with respect to multiple transparent display panels 20 of the interactive display 32 to enable multiple guests to interact with the interactive display 32 at the same time. In certain embodiments, each motion-tracking device 18 may be dedicated to specific transparent display panels 20 and/or a particular region of the transparent display panel 20 for tracking movement of devices 12.

As depicted, the transparent display panel 20 includes a visible indicator 40 of a position for the user 39 to point at when conducting a movement of the device 12 in accordance with a pattern 42 to induce a special effect in the interactive display 32. In certain embodiments, the visible indicator 40 may be provided by emitting light from an LED embedded in the transparent display panel 20. In certain embodiments, the visible indicator 40 may be shown via the diodes of an OLED screen or projection on a projection screen via the projectors 30 (depending on the type of transparent display panel 20). In certain embodiments, the visible indicator 40 may be color-coded. In particular, the visible indicator 40 may appear in a first color (e.g., red) when the device 12 is not pointed in the correct area (i.e., where the visible indicator 40 is located) and may appear in a second different color (e.g., green) when the device 12 is pointing in the correct area. In certain embodiments, the visible indicator 40 may be a physical marker disposed on or embedded in the transparent display panel 20. In certain embodiments, the visible indicator 40 may be a marking on the transparent display panel 20.

As noted above, the transparent display panel 20 is configured to display feedback indicative of the tracked movement of the device 12. In particular, a tracked pattern (e.g., graphic) of the movement (i.e., the actual movement) of the device 12 is displayed on the transparent display panel 20 as indicated by reference numeral 44. In certain embodiments, the feedback indicative of the tracked movement of the device 12 is provided in real time (i.e., as the device 12 is being manipulated) as depicted in FIG. 2. In certain embodiments, the pattern is only displayed after the movement of the device 12 has been completed. In certain embodiments, the actual pattern may be displayed as a continuous path (i.e., showing each point along the path of the tracked movement) as depicted in FIG. 2. In certain embodiments, displaying the actual pattern includes only displaying some of the points (e.g., discrete points) along the path of the tracked movement. In certain embodiments, the actual pattern is displayed according to a color coding. For example, if the actual pattern is incorrect (which will not elicit a special effect from the interactive display 32) it may be shown in a first color (e.g., red) and if the actual pattern is correct (which will elicit a special effect from the interactive display 32) it may be shown in a different second color (e.g., green). In certain embodiments, if the tracked movement is correct, a generic pattern representative of the correct movement of the device 12 may be shown on the transparent display panel 20. In certain embodiments, if the tracked movement is incorrect, the generic pattern representative of the correct movement of the device 12 may be shown to provide assistance. In certain embodiments, this generic pattern may be shown after each incorrect attempt or after a set number of incorrect attempts (e.g., 2 or 3 incorrect attempts). In certain embodiments, this generic pattern may be shown after a set period of time (e.g., 30 seconds or some other set period of time) has passed upon beginning to try to manipulate the device 12 correctly. In certain embodiments, the actual pattern and a generic pattern of the correct movement may both be shown separately and/or simultaneously on the transparent display panel 20 to assist the guest as they are attempting the pattern. In certain embodiments, the generic pattern of the correct movement may be etched in the transparent display panel 20 to provide guidance to the guest manipulating the device 12.

In certain embodiments, the camera 22 (and/or additional cameras separate from the device 12) may be utilized to detect an angle from which light (e.g., IR) is being emitted or reflected from the device 12. In certain embodiments, one or more additional cameras 24 (FIG. 1) may be utilized to detect the angle from which light (e.g., IR) is being emitted or reflected from the device 12. The angle from which the light (e.g., IR) is being emitted or reflected (e.g., as detected by the camera 22 and/or the cameras) may be utilized to determine a location (e.g., a height) along the transparent display panel 20 for providing the feedback. In certain embodiments, detecting the angle from which the light (e.g., IR) is being emitted or reflected from the device 12 may also be utilized to determine where the visible indicator 40 is located. In certain embodiments, the visible indicator 40 may initially be displayed at a standard location (e.g., height). After detecting the angle from which the light (e.g., IR) is being emitted or reflected from the device 12, the location or height for the visible indicator 40 may be changed (i.e., at a correct or determined height for the guest) to accommodate where the device is being directed towards the transparent display panel 20.

Figure 3:
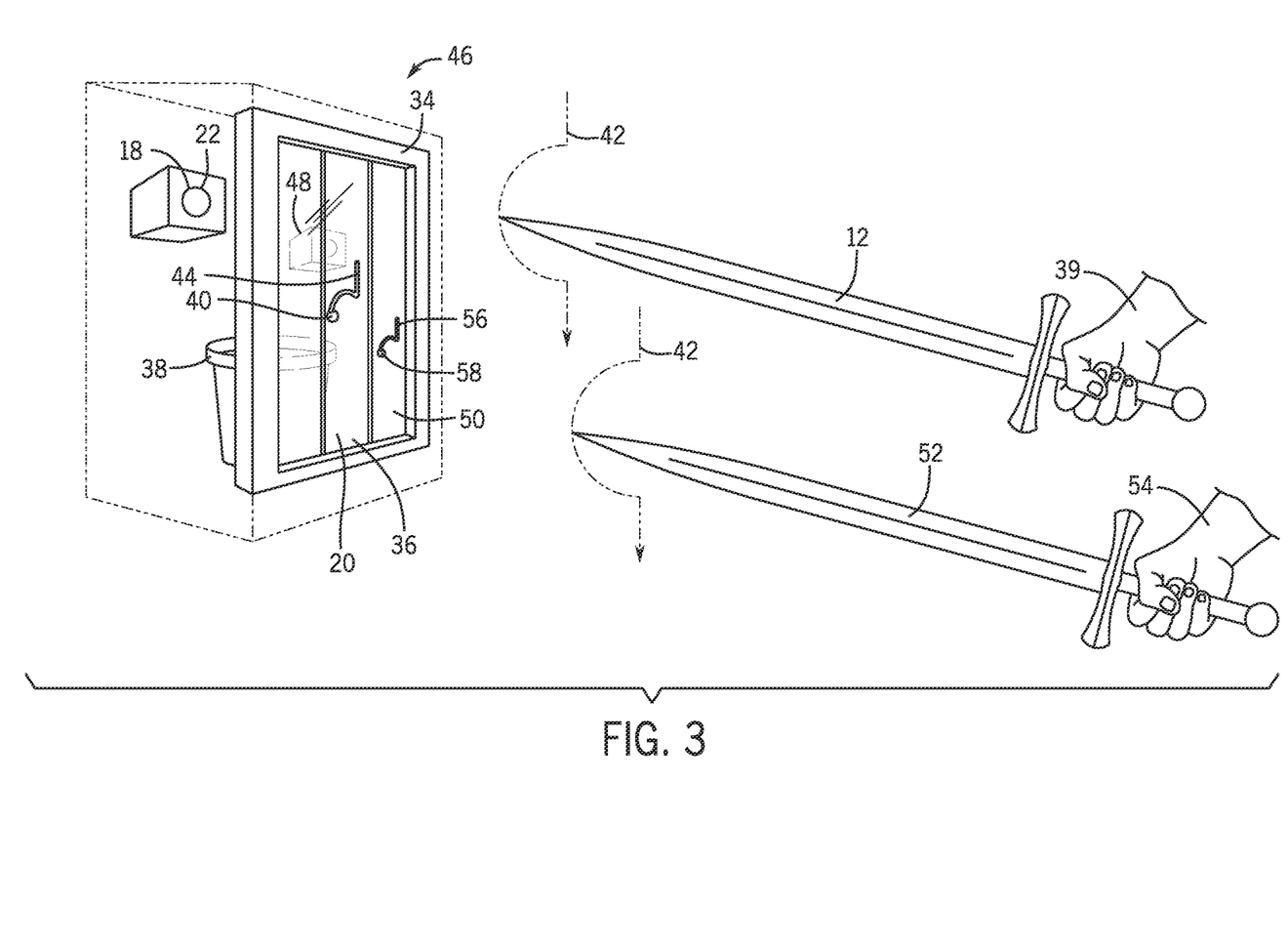
FIG. 3 is a schematic view of an interactive display having the system in FIG. 1 (e.g., having multiple motion-tracking devices and multiple transparent display panels), in accordance with aspects of the present disclosure.

FIG. 3 is a schematic view of an interactive display 46 having the system in FIG. 1. The interactive display 46 is similar to the interactive display 32 in FIG. 2. As depicted in FIG. 3, the interactive display 46 includes an additional motion-tracking device 48 (similar to the motion-tracking device 18) and an additional transparent display panel 50 (similar to the transparent display panel 20). The motion-tracking device 18 may be utilized as described above in FIG. 2 to track the motion of the device 12 manipulated by the user 39 and display the tracked pattern (as indicated by reference numeral 44) of movement on the device 12 on the transparent display panel 20. The motion-tracking device 48 may be utilized similarly to track the motion of another device 52 manipulated by a different user 54 (e.g., different guest) and display the tracked pattern (as indicated by reference numeral 56) on the transparent display panel 50. As depicted in FIG. 3, the pattern 42 to induce a special effect is the same for each transparent display panel 20, 50. In certain embodiments, the pattern to induce the special effect may be different for each display panel 20, 50. In certain embodiments, the pattern to induce the special effect (whether the same or different) may induce a different special effect in the interactive display 46 with the respect to the different transparent display panels 20, 50. As depicted in FIG. 3, the graphics of the tracked patterns 44, 56 are displayed at different heights. In addition, visible indicators 40, 58 for indicating where to point the respective devices 12, 52 are displayed at different heights.

Figure 4:
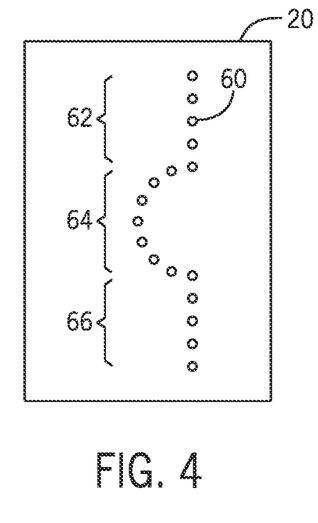
FIG. 4 is a schematic view of a tracked pattern displayed on a transparent display panel (e.g., displaying discrete points), in accordance with aspects of the present disclosure.
Figure 5:
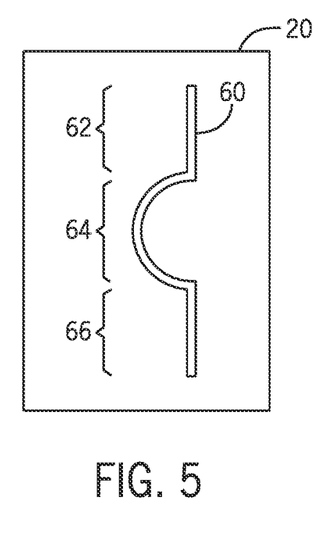
FIG. 5 is a schematic view of a tracked pattern displayed on a transparent display panel (e.g., displaying the pattern continuously), in accordance with aspects of the present disclosure.

FIGS. 4 and 5 are schematic views of a tracked pattern 60 displayed on the transparent display panel 20. As depicted in FIG. 4, the tracked pattern 60 is displayed as discrete points along the path. As depicted in FIG. 5, the tracked pattern 60 is displayed as a continuous path. In certain embodiments, the tracked pattern 60 in FIGS. 4 and 5 is the actual pattern of the tracked movement of the device. In certain embodiments, the tracked pattern 60 is a generic pattern representing the correct pattern of movement to trigger the special effect within the interactive display. In certain embodiments, the tracked pattern 60 may be shown as each point is reached. In certain embodiments, the tracked pattern 60 may be shown as sections (e.g., a first section 62, a second section 64, a third section 66, etc.) are reached or completed.

Figure 6:
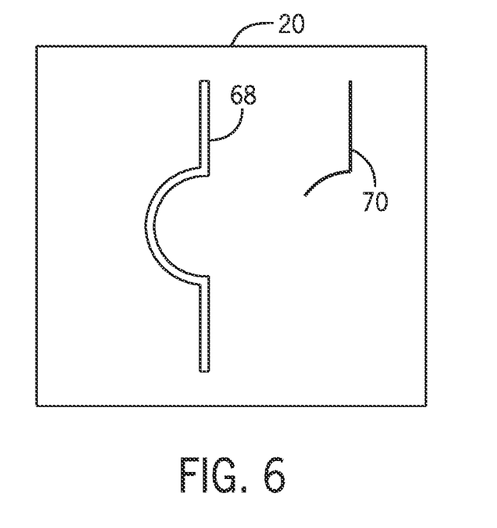
FIG. 6 is a schematic view of a generic pattern and a tracked pattern displayed on a transparent display panel, in accordance with aspects of the present disclosure.

FIG. 6 is a schematic view of a generic pattern 68 and a tracked pattern 70 displayed on the transparent display panel 20. As depicted, the generic pattern 68 representing the correct pattern of movement to trigger the special effect in the interactive display may be displayed on the transparent display panel 20 to provide guidance to the user (e.g., guest) manipulating the device. In certain embodiments, the generic pattern 68 may be shown via the diodes of an OLED screen or projection on a projection screen via the projectors (depending on the type of transparent display panel 20). In certain embodiments, the generic pattern 68 may be shown via LEDs embedded in the transparent display panel 20. As depicted, the tracked pattern 70 of the actual movement of the device is shown adjacent to the generic pattern 68 (e.g., as the movement for generating the special effect is being attempted by the guest manipulating the device). The generic pattern 68 may be displayed above, below, overlapping with, or to a side of the tracked pattern 70. In certain embodiments, the generic pattern 68 may be displayed in the same location of the tracked pattern 70 (e.g., with the generic pattern 68 and the tracked pattern 70 being displayed in different colors). In certain embodiments, the generic pattern 68 may only be shown after each incorrect attempt or after a set number of incorrect attempts (e.g., 2 or 3 incorrect attempts). In certain embodiments, the generic pattern 68 may be shown after a set period of time (e.g., 30 seconds or some other set period of time) has passed upon beginning to try to manipulate the device correctly. In certain embodiments, the generic pattern 68 of the correct movement may be etched in the transparent display panel 20 to provide guidance to the guest manipulating the device.

Figure 7:
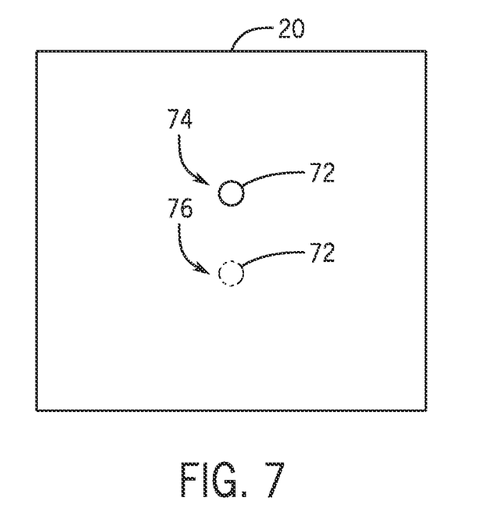
FIG. 7 is a schematic view of an adjustment of visible indicators for pointing a device at a transparent display panel, in accordance with aspects of the present disclosure.

FIG. 7 is a schematic view of adjustment of visible indicators for pointing a device at the transparent display panel 20. As depicted, the transparent display panel 20 includes a visible indicator 72 (at a first height or location 74) of a position for a user to point at when conducting a movement of the IR-emitting device to induce a special effect in an interactive display 32 (FIG. 2). The first height or location 74 may be a standard height or location for initially displaying the visible indicator. In certain embodiments, upon detecting an angle from which the light (e.g., IR) is being emitted or reflected from a device, a location of the visible indicator 72 may be changed to a second height or location 76 different from the first height or location 74. In certain embodiments, the visible indicator 72 may be provided by emitting light from an LED embedded in the transparent display panel 20. Different LEDs may be embedded in the different locations 74, 76. In certain embodiments, the visible indicator 72 may be shown via the diodes of an OLED screen or projection on a projection screen via the projectors (depending on the type of transparent display panel 20). Adjusting a height of a location of the visible indicator 72 enables guests (especially children) to better interact with the transparent display panel 20.

Figure 8:
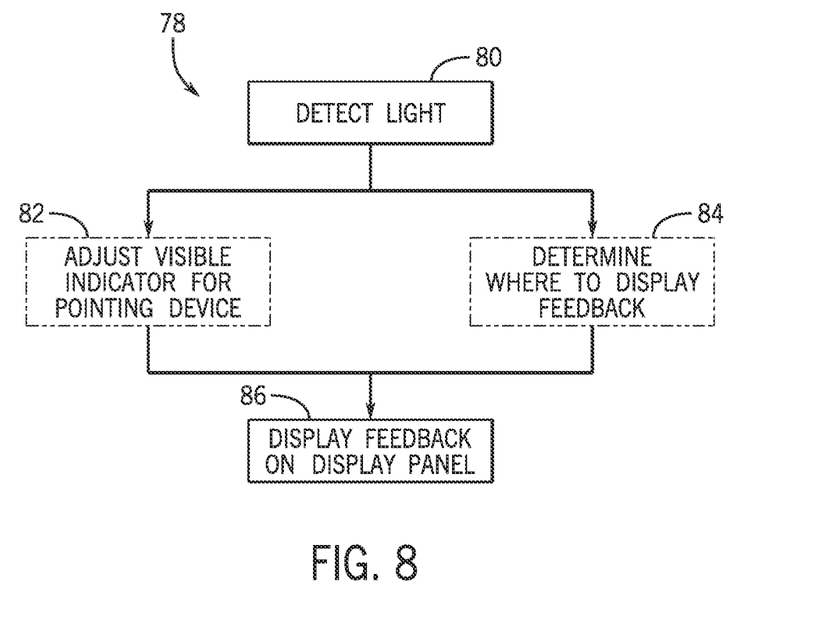
FIG. 8 is a flow chart of a method for interacting with an interactive display, in accordance with aspects of the present disclosure.

FIG. 8 is a flow chart of a method 78 for interacting with an interactive display. The steps of the method 78 may be performed by the system 10 as described in FIG. 1 (e.g., as part of an interactive display). The method 78 includes detecting (e.g., via a motion-tracking device) light (e.g., light) emitted or reflected from a device directed at a front of a transparent display panel (block 80). In certain embodiments, in response to the detected light, the method 78 includes adjusting a visible indicator indicating a location or point on the transparent display panel where the device should be directed when conducting a particular movement to induce a special effect in an interactive display (block 82). In certain embodiments, in response to the detected light, the method 78 includes determining where to display feedback on the transparent display panel indicative of the tracked movement of the device (block 84). The method 78 also includes displaying, on the transparent display panel, the feedback indicative of the tracked movement of the device (block 86). The feedback may be as described above.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosed subject matter.

The invention claimed is:

1. An interactive display comprising:
a transparent display panel configured to simulate a windowpane; and
a motion-tracking device located behind the transparent display panel and configured to perform tracking of movement of a device directed at a front of the transparent display panel, wherein the device is configured to be manipulated by a user, and wherein the transparent display panel is configured to display feedback indicative of the tracked movement of the device.

2. The interactive display of claim 1, wherein the transparent display panel comprises an organic light-emitting diode screen.

3. The interactive display of claim 1, wherein the transparent display panel comprises a rear projection screen, and the interactive display comprises at least one projector located behind the transparent display panel and is configured to project the feedback on the rear projection screen.

4. The interactive display of claim 1, wherein the transparent display panel is configured to provide the feedback in real time.

5. The interactive display of claim 1, wherein the feedback comprises an actual pattern of the tracked movement.

6. The interactive display of claim 5, wherein the actual pattern comprises a continuous path of the tracked movement.

7. The interactive display of claim 5, wherein the actual pattern comprises discrete points along a path of the tracked movement.

8. The interactive display of claim 1, wherein the feedback comprises a generic pattern representative of correct movement of the device configured to trigger a special effect of the interactive display.

9. The interactive display of claim 8, wherein the transparent display panel is configured to display the generic pattern upon the user performing the correct movement within the device.

10. The interactive display of claim 8, wherein the transparent display panel is configured to display the generic pattern upon the user performing incorrect movement of the device a set number of times or after a set time period has passed.

11. The interactive display of claim 1, the interactive display comprising at least one camera disposed behind the transparent display panel and configured to detect an angle at which the tracked movement is occurring to enable the feedback to be displayed on the transparent display panel at a determined height relative to where the user is directing the device at the transparent display panel.

12. The interactive display of claim 1, wherein the transparent display panel is configured to provide a visual indicator of where to direct the device toward on the transparent display panel.

13. The interactive display of claim 1, the interactive display comprising a window frame having a plurality of the transparent display panels.

14. The interactive display of claim 13, the interactive display comprising a plurality of the motion-tracking devices located behind the window frame, wherein each motion-tracking device of the plurality of the motion-tracking devices is configured to perform tracking of respective movement of a respective device directed at a respective front of a respective transparent display panel of the plurality of the transparent display panels.

15. The interactive display of claim 13, wherein at least two transparent display panels of the plurality of the transparent display panels are configured to display respective feedback indicative of respective tracked movement of a respective device.

16. The interactive display of claim 1, wherein the transparent display is configured to display images relevant to a theme of the interactive display.

17. A method for providing feedback to a guest interacting with an interactive display, the method comprising:
  detecting, via a motion-tracking device, movement of a device directed at a front of a transparent display panel of the interactive display by a user manipulating the device, wherein the transparent display panel is configured to simulate a windowpane; and
  displaying, on the transparent display panel, feedback indicative of the tracked movement of the device.

18. The method of claim 17, wherein displaying the feedback comprises displaying the feedback in real time.

19. The method of claim 17, wherein the transparent display panel comprises an organic light-emitting diode screen.

20. A system for providing feedback to a guest interacting with an interactive display, the system comprising:
  a transparent organic light-emitting diode (OLED) screen configured to simulate a windowpane; and
  a motion-tracking device located behind the transparent OLED screen and configured to perform tracking of movement of a device directed at a front of the transparent OLED, wherein the device is configured to be manipulated by a user, and wherein the transparent display panel is configured to display feedback indicative of the tracked movement of the device as the user is manipulating the device.

* * * * *